Aug. 7, 1951     L. E. W. MONTROSE-OSTER     2,563,261
SUSPENSION SYSTEM FOR VEHICLES
Filed May 24, 1946     4 Sheets-Sheet 3
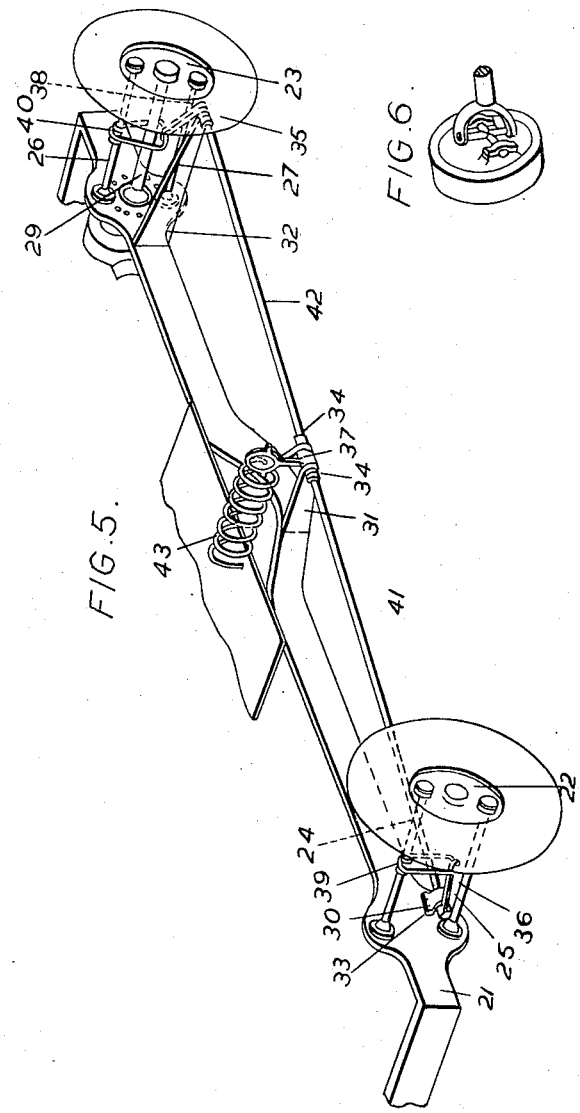
Inventor
LOUIS EUGENE WIDOLT·MONTROSE·OSTER
By Emery, Holcombe a Blair
Attorneys Aug. 7, 1951

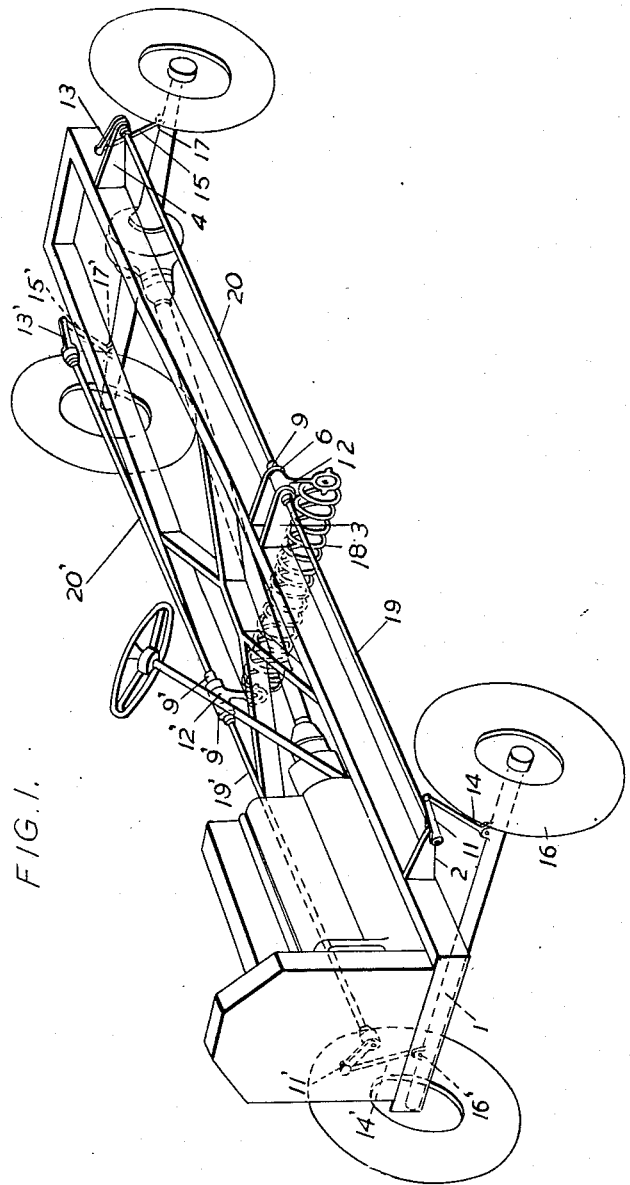

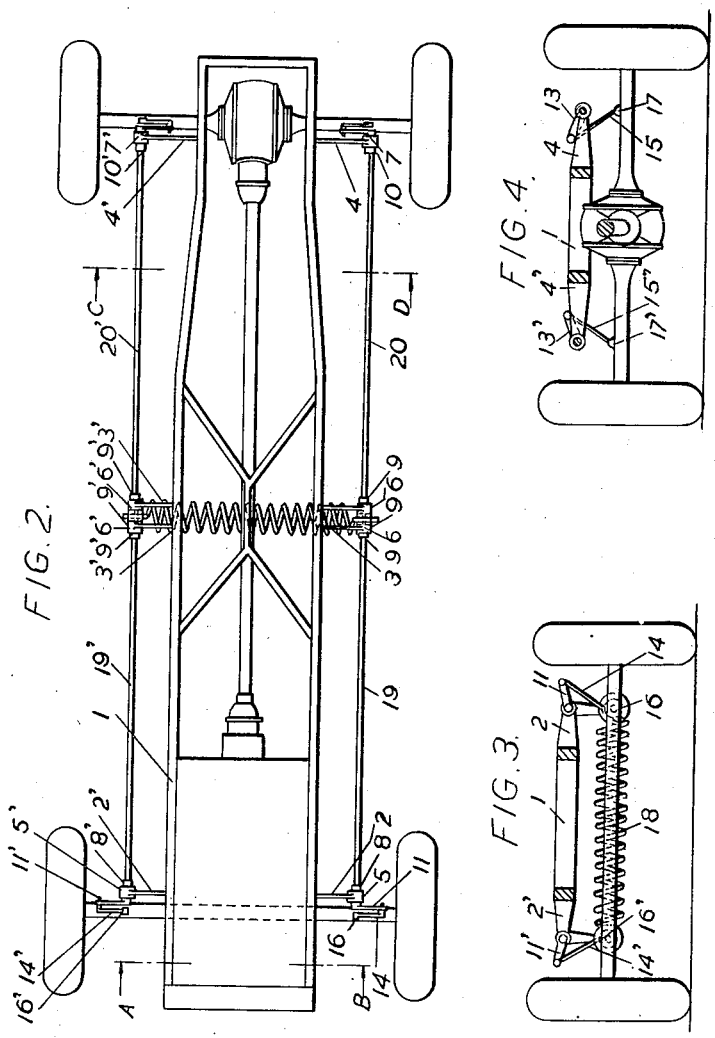

L. E. W. MONTROSE-OSTER 2,563,261

SUSPENSION SYSTEM FOR VEHICLES

Filed May 24, 1946

Inventor
LOUIS E. W. MONTROSE-OSTER
By Emery, Holcombe & Blair
Attorneys

Patented Aug. 7, 1951

2,563,261

UNITED STATES PATENT OFFICE 2,563,261

SUSPENSION SYSTEM FOR VEHICLES

Louis Eugene Widolt Montrose-Oster, Brussels, Belgium, assignor of one-half to Pollopas Patents Limited, London, England, a British company Application May 24, 1946, Serial No. 672,055
In France January 20, 1943

Section 1, Public Law 690, August 8, 1946
Patent expires January 20, 1963

7 Claims. (Cl. 280—104)

This invention relates to suspension systems for vehicles and has for object to provide a self-stabilising resilient conjugate suspension applicable to vehicles which move mainly in one running direction and have four effective or virtual suspension points, the essential resilient elements of the suspension being preferably subjected to torsion.

Several proposals have been made for conjugating the suspension of vehicles having four effective or virtual suspension points, and for stabilising such an arrangement which is by nature unstable. For conjugating the suspension of two neighbouring wheels, for instance, two wheels on the same side, these prior proposals in general involve the use of members subjected either to flexion, to traction or to a combination of these two actions. Consequently, connecting devices are needed which considerably complicate and increase the weight of the suspension system. Furthermore, connecting members are necessary between the resilient members of the two neighbouring wheels.

It has also been proposed to use torsion bars, but the simplification obtained thereby has necessitated a certain number of additional members to obtain, in particular, relative stability about the transverse axis, that is, resistance to galloping movement.

All these disadvantages are obviated by the present invention which renders restoring devices as such superfluous. Whi'st the proposals hitherto known necessarily required, between two neighbouring wheels, connecting members the weight of which was added to the weight of a usual suspension, in accordance with this invention one and the same element functions at the same time as a resilient member and as a connecting member.

Contrary to the known proposals, stability is effected by a restoring couple produced, as a function of the inclination of the chassis about its transverse axis, either by automatic variation of the operative length of lever arms forming part of the system, or by means of a resilient member, or by a combination of both.

A vehicle having a suspension according to the invention is free from galloping movement, and hence no device need be provided for opposing such movement.

The accompanying drawings diagrammatically illustrate, by way of examp'e, three embodiments of conjugate suspension according to the invention, applied to automobile vehicle chassis. In the drawings, Fig. 1 is a perspective view of a chassis having front and rear axles fitted with one embodiment of the new suspension. Fig. 2 is a plan view, and Figs. 3 and 4 represent sections on A—B and C—D of Fig. 2, looking from the front of the chassis towards the rear, i. e., against the running direction.

Fig. 5 is a fragmentary perspective view showing one side of a four-wheeled chassis and illustrates an embodiment of the invention in which the four wheels are independently mounted. Fig. 6 shows a detail of Fig. 5 on a larger scale.

Figure 7:
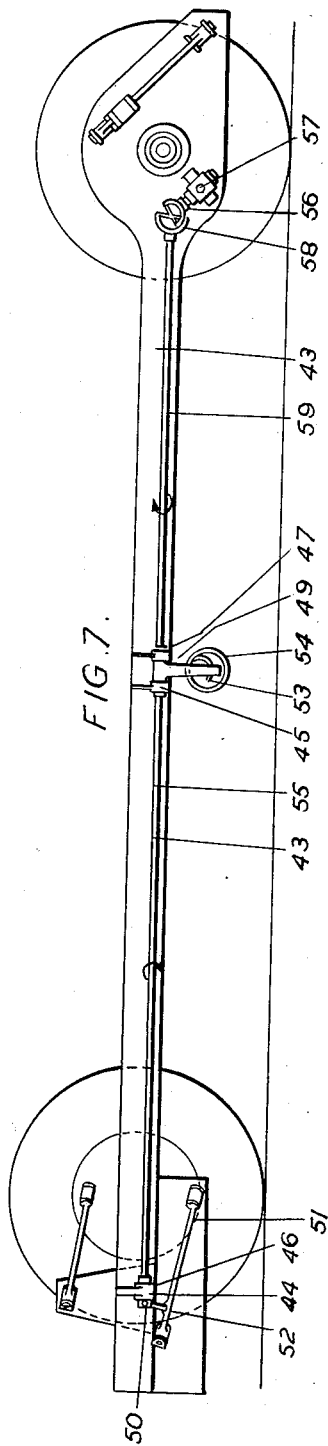
Figs. 7 and 8 are fragmentary elevation and plan views respectively showing an application of the new conjugate suspension to a chassis having four independent wheels arranged according to an invention described in another patent.

In the drawings, the parts of the new suspension are depicted in heavy lines, other parts such as the chassis, axles, wheels, motor, radiator, steering wheel, being indicated in light lines.

In the embodiment illustrated in Figs. 1 to 4 the chassis 1 is provided at each side with brackets 2, 3, 4 having sockets 8, 9, 10 at their extremities lodged in the bearings 5, 6, 7 respectively. It is preferred, in most cases, to align the sockets at the same side along a common axis. Integral with the sockets 8, 9, 10 are levers 11, 12, 13 respectively, of which the levers 11 and 13 form a certain angle with the horizontal, while the lever 12 of the central socket is substantially in a vertical position. The free ends of the levers 11 and 13 are connected with the respective axles by appropriate members 14 and 15 (such as ball joints, silent block joints or the like) linked to the front and back axles at 16 and 17.

At the other side of the chassis similar members are provided which are designated by the same reference numerals respectively but distinguished by indices. The free ends of the levers 12 and 12' are connected together by a resilient member capab'e of compression and also traction, for instance a coil spring 18.

The conjugation of the two wheels on the same side of the chassis is effected by resilient connecting members subjected to torsion, in the form of torsion bars 19, 20 and 19', 20'. The central sockets 9 and 9' are integral with their resilient members or torsion bars, whether a single bar be provided extending from front to rear, or two bars be arranged in series.

In order to facilitate the understanding of Figs. 1 to 4, the various axle guide members which form no part of the present invention are not represented.

These figures show the chassis under load, as indicated by the inclination of the levers 11 and 13. The relative angle between these two levers determines the restoring force which ensures stability about the transverse axis. Consequently, the flexibility of the coil spring 18 will vary, except in special cases, between double and a multiple of the flexibility of a bar. This means that the advantages due to the conjugation of two wheels on the same side, namely, a flexibility under dynamic load twice as great as under static load, smaller twisting effort, etc., are sacrificed to the extent of a small percentage only, in ensuring the stability of the suspension.

The chassis is therefore supported virtually by a single transverse axle. Hence any influence capable of producing a galloping movement is absent, and consequently no device for preventing such movement is needed.

In the embodiment illustrated in the partial perspective view of Fig. 5 the chassis 21 is provided with a similar resilient conjugate suspension to that just described but applied in this case to independently-mounted wheels fitted in a special manner as will now be described. Each of the hubs 22 and 23 is connected with the chassis by means of two supporting arms 24, 25 and 26, 27 respectively provided at their extremities with Cardan joints, one of which is shown in Fig. 6 of a larger scale. The axes of the front Cardans are arranged in such a way as to permit the steering of the wheels, whilst taking into account the play, set and inclination of the pivoting axis relatively to the vertical. At the rear, the two Cardan supports which ensure the parallelism of the wheels with or without the aid of the Cardan shaft 29, are equivalent to three ball joints and can be replaced by such if desired. This arrangement allows the hubs to move on the surface of a sphere whilst remaining parallel to themselves.

The chassis is provided at each side with three brackets 30, 31, 32 having bearings respectively holding the sockets 33, 34, 35 which are preferably aligned along the same axis. The levers 36, 37, 38 are integral with the sockets 33, 34, 35 respectively. The lever 36 is connected at its free end to the supporting arm 24 by means of a suspension ring 39, the free end of the lever 37 acts upon a coil spring 43, and the lever 38 is connected at its free end to the arm 26 by means of a suspension ring 40 suitably widened to clear the Cardan shaft 29 in all positions which the lever 38 and ring 40 are likely to assume relatively to the shaft. The sockets 33, 34, 35 are connected together by two torsion bars 41, 42 in series.

The other side (not shown) of the chassis is provided with similar members.

In addition to the advantages mentioned in the description of the construction according to Figs. 1 to 4, the embodiment of Fig. 5 has the further advantage of allowing the wheels a limited movement relatively to the chassis in or against the running direction, such movement being limited by the suspension. This further diminishes the effect of forces that may act vertically on the extremities of the chassis and so be capable of causing a galloping movement.

Figure 8:
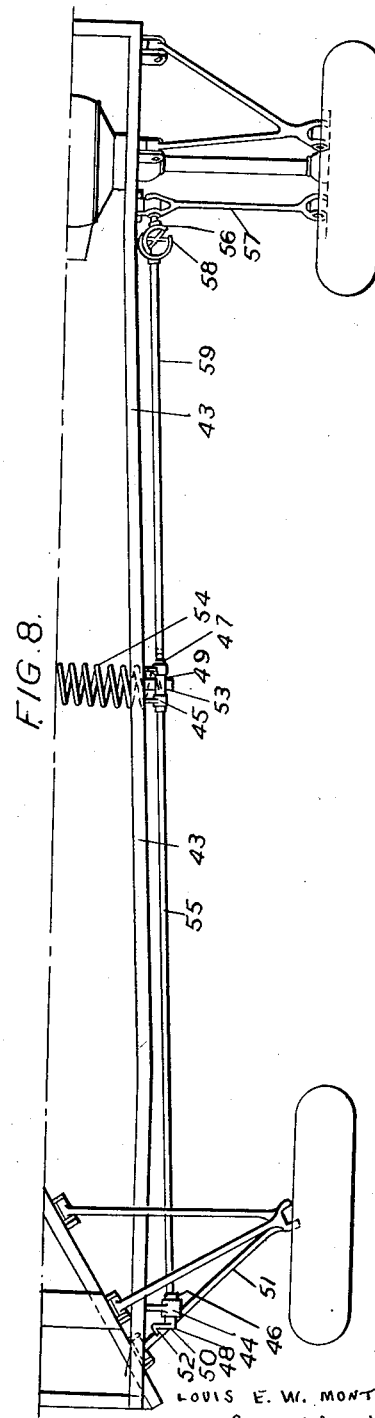

Figs. 7 and 8 illustrate an application of the new suspension to a chassis provided with four independently-mounted wheels the arrangement of which forms the subject of a previous patent application. In this embodiment, the chassis 43 is provided with brackets 44, 45 fitted with bearings 46, 47 in which are lodged the sockets 48, 49 respectively. A lever 50 integral with the socket 48 is connected with an arm 51 supporting the front wheel, by means of a small connecting rod 52. The free end of a lever 53 integral with the socket 49 engages a coil spring 54 which is capable of being subjected to traction as well as to compression. A torsion bar 55 acting as a front spring connects the front socket 48 with the central socket 49. The upper end of the hinge-pin 56 of the lower supporting arm 57 of the rear wheel, which pin is inclined to the horizontal, is fitted with a ball joint 58 connected to the central socket 49 by means of a torsion bar 59 which acts as a rear spring.

The other side of the chassis, not shown, is fitted in a symmetrical manner.

This construction eliminates rear brackets, sockets and levers, and enables the characteristics of the front and rear parts of the suspension to be determined as desired, for instance so as to obtain a progressive hardening of the suspension under load without sacrificing the principal advantages of the conjugate suspension.

As will be seen, each embodiment of the invention enables practically total absorption of all vibration solely by the resilient conjugate suspension itself. Thus, no vibration is communicated either to the chassis or to the wheels, and consequently the use of shock absorbers is no longer indispensable.

The invention is susceptible of numerous constructional modifications, besides the embodiments above described by way of non-limitative examples. Notably, the central coil spring may be replaced, according to circumstances, by any other suitable resilient intermediate member. On the other hand, instead of using two torsion bars in series, it is possible, for instance, to employ one torsion bar arranged in series with a leaf spring pivoting about an axis integral with its attachment collar.

I claim:

1. In a vehicle adapted to move mainly in one running direction and comprising a chassis supported on wheels at four points, two at each longitudinal side of the chassis, a resilient conjugate suspension system comprising two lateral resilient conjugate suspensions, one at each longitudinal side of the chassis, each of said two lateral conjugate suspensions including three levers fulcrumed to the chassis at points spaced along the same longitudinal side of the chassis, the two extreme ones of said levers being fulcrumed to the chassis respectively at the two supporting points at the same side of the chassis, means including torsion spring means extending longitudinally of the chassis for resiliently and mechanically interconnecting said three levers, one of said two extreme levers being upwardly inclined inwardly towards the chassis and the other of said two levers being upwardly inclined outwardly from the chassis, links connecting the upper extremities of said two levers respectively to the wheel supports at the same side of the chassis, the middle one of said three levers being substantially vertical and fulcrumed to the chassis at a point substantially midway between said two extreme levers corresponding to the virtual center point of said longitudinal means interconnecting said three levers, and resilient means responsive both to push and pull action extending transversely of the chassis and interconnecting the extremities of the two middle levers of said two lateral conjugate suspensions.

2. In a vehicle adapted to move mainly in one running direction and comprising a chassis supported on wheels at four points, two at each longitudinal side of the chassis, a resilient conjugate suspension system comprising two lateral resilient conjugate suspensions, one at each longitudinal side of the chassis, each of said two lateral conjugate suspensions including three levers fulcrumed to the chassis at points spaced along the same longitudinal side of the chassis, the two extreme ones of said levers being fulcrumed to the chassis respectively at the two supporting points at the same side of the chassis, means including torsion spring means extending longitudinally of the chassis for resiliently and mechanically interconnecting said three levers, one of said two extreme levers being upwardly inclined inwardly towards the chassis and the other of said two levers being upwardly inclined outwardly from the chassis so that said two levers diverge upwardly at an obtuse angle of divergence, link rods extending downwardly from the upper extremities of said two levers at acute angles thereto and connecting said extremities respectively to the wheel axles at the same side of the chassis, the middle one of said three levers being substantially vertical and fulcrumed to the chassis at a point substantially midway between said two extreme levers corresponding to the virtual center point of said longitudinal means interconnecting said three levers, and resilient means responsive both to push and pull action extending transversely of the chassis and interconnecting the extremities of the two middle levers of said two lateral conjugate suspensions.

3. In a vehicle adapted to move mainly in one running direction and comprising a chassis supported on wheels at four points, two at each longitudinal side of the chassis, a resilient conjugate suspension system comprising two lateral resilient conjugate suspensions, one at each longitudinal side of the chassis, each of said two lateral conjugate suspensions including three levers fulcrumed to the chassis at points spaced along the same longitudinal side of the chassis, the two extreme ones of said levers being fulcrumed to the chassis respectively at the two supporting points at the same side of the chassis, means including torsion spring means extending longitudinally of the chassis for resiliently and mechanically interconnecting said three levers, one of said two extreme levers being upwardly inclined inwardly towards the chassis and the other of said two levers being upwardly inclined outwardly from the chassis, links connecting the upper extremities of said two levers respectively to the wheel supports at the same side of the chassis, the middle one of said three levers being substantially vertical and fucrumed to the chassis at a point substantially midway between said two extreme levers corresponding to the virtual center point of said longitudinal means interconnecting said three levers, and resilient means responsive both to push and pull action extending transversely of the chassis and interconnecting the extremities of the two middle levers of said two lateral conjugate suspensions, said resilient means having a flexibility which is a multiple of that of said torsion spring means so as not to transmit the movement of a wheel at one side of the chassis to a wheel at the opposite side of the chassis.

4. In a vehicle adapted to move mainly in one running direction and comprising a chassis supported on wheels at four points, two at each longitudinal side of the chassis, a resilient conjugate suspension system comprising two lateral resilient conjugate suspensions, one at each longitudinal side of the chassis, each of said two lateral conjugate suspensions including three levers fulcrumed to the chassis at points spaced along the same longitudinal side of the chassis, the two extreme ones of said levers being fulcrumed to the chassis respectively at the two supporting points at the same side of the chassis, means including torsion spring means extending longitudinally of the chassis for resiliently and mechanically interconnecting said three levers, one of said two extreme levers being upwardly inclined inwardly towards the chassis and the other of said two levers being upwardly inclined outwardly from the chassis so that said two levers diverge upwardly at an obtuse angle of divergence, link rods extending downwardly from the upper extremities of said two levers at acute angles thereto and connecting said extremities respectively to the wheel axles at the same side of the chassis, the middle one of said three levers being substantially vertical and fulcrumed to the chassis at a point substantially midway between said two extreme levers corresponding to the virtual center point of said longitudinal means interconnecting said three levers, and resilient means responsive both to push and pull action extending transversely of the chassis and interconnecting the extremities of the two middle levers of said two lateral conjugate suspensions, said resilient means having a flexibility which is a multiple of that of said torsion spring means so as not to transmit the movement of a wheel at one side of the chassis to a wheel at the opposite side of the chassis.

5. In a vehicle adapted to move mainly in one running direction, and the combination of a chassis frame supported on wheels at four points, two at each longitudinal side of said frame, torsion bars rotatably carried by said frame and extending longitudinally thereof between the two supporting points at each side of said frame, upwardly inclined levers fast on the four ends of said bars, the rear two of said levers on the rear ends of said bars being directed inwardly towards said frame and the front two of said levers on the front ends of said bars being directed outwardly from said frame at such angles that the front and rear levers at each side of said frame diverge upwardly at an obtuse angle of divergence, link rods at acute angles to said levers connecting the upper extremities of said levers to the wheel axles, two substantially vertical levers fast on said bars at substantially their midpoints, and a transverse coil spring responsive both to compression and to tension interconnecting the extremities of said two last-mentioned levers, said spring having a flexibility appreciably greater than that of said torsion bars.

6. In a vehicle adapted to move mainly in one running direction and comprising a chassis supported on wheels at four points, two at each longitudinal side of the chassis, a resilient conjugate suspension system comprising two lateral resilient conjugate suspensions, one at each longitudinal side of the chassis, each of said two lateral conjugate suspensions including resilient means capable of resilient torsional reaction rotatably carried by the chassis and extending longitudinally thereof between the two supporting points at the same side of the chassis, leverage means capable of applying torsional leverage to said resilient means attached to said resilient means at each of said two supporting points, and connecting means connecting said leverage means respectively to the wheel supports at the same side of the chassis, the combination of said leverage means and said connecting means being operative to create a restoring force in response to vertical displacements of the wheels relatively to the chassis by varying the transmission ratio of the load from the chassis to the wheels and vice versa in angular functions as the wheels and the chassis assume different relative positions so that the torsional deflection ratio of said resilient means to the relative displacement of the wheels increases for relative displacement of the wheels towards the chassis and decreases for relative displacement of the wheels away from the chassis, substantially vertically extending levers attached respectively to the virtual center point of said resilient means of each lateral conjugate suspension, and resilient means responsive to pull and push action arranged transversely of the chassis and interconnecting the extremities of said levers.

7. In a vehicle adapted to move mainly in one running direction and comprising a chassis supported on wheels at four points, two at each longitudinal side of the chassis, a resilient conjugate suspension system comprising two lateral resilient conjugate suspensions, one at each longitudinal side of the chassis, each of said two lateral conjugate suspensions including resilient means capable of resilient torsional reaction rotatably carried by the chassis and extending longitudinally thereof between the two supporting points at the same side of the chassis, leverage means capable of applying torsional leverage to said resilient means attached to said resilient means at each of said two supporting points, and connecting means connecting said leverage means respectively to the wheel supports at the same side of the chassis, the combination of said leverage means and said connecting means being operative to create a restoring force in response to vertical displacements of the wheels relatively to the chassis by varying the transmission ratio of the load from the chassis to the wheels and vice versa in angular functions as the wheels and the chassis assume different relative positions so that the torsional deflection ratio of said resilient means to the relative displacement of the wheels increases for relative displacement of the wheels towards the chassis and decreases for relative displacement of the wheels away from the chassis, substantially vertically extending levers attached respectively to the virtual center point of said resilient means of each lateral conjugate suspension, and resilient means responsive to pull and push action arranged transversely of the chassis and interconnecting the extremities of said levers, said last-mentioned resilient means having a flexibility appreciably greater than that of said first-mentioned resilient means of each lateral conjugate suspension.

LOUIS EUGENE WIDOLT
MONTROSE-OSTER.

REFERENCES CITED

The following references are of record in the file of this patent:

UNITED STATES PATENTS

| Number | Name | Date |
|---|---|---|
| 12,910 | Hubbard | May 22, 1855 |
| 962,256 | Rockwell | June 21, 1910 |
| 1,205,612 | Ford | Nov. 21, 1916 |
| 1,667,754 | Van Malderghem | May 1, 1928 |
| 1,831,631 | Manns | Nov. 10, 1931 |
| 2,083,381 | Hutchison | June 8, 1937 |
| 2,099,819 | Mercier | Nov. 23, 1937 |
| 2,168,630 | Schiff | Aug. 8, 1939 |
| 2,416,388 | Hendrix | Feb. 25, 1947 |